3,412,158
PROCESS FOR THE PREPARATION OF
ALIPHATIC AMINES
Dorothee M. McClain, Cincinnati, Ohio, assignor to National Distillers and Chemical Corporation, New York, N.Y., a corporation of Virginia
No Drawing. Filed Oct. 11, 1965, Ser. No. 494,858
9 Claims. (Cl. 260—585)

ABSTRACT OF THE DISCLOSURE

Preparation of primary alkyl amines from low molecular weight olefins and ammonia. The process is carried out by contacting the reactant with a noble metal-containing catalyst of Group VIII of the Periodic Table at moderately elevated temperatures in the range of about 90° C. to 175° C. and at ambient or elevated pressures.

---

The present invention relates to a process for the preparation of aliphatic amines. More particularly, the invention pertains to a process for the preparation of primary alkyl amines from low molecular weight olefins and ammonia.

A number of processes have been proposed heretofore for the preparation of lower aliphatic amines. One such process is described in U.S. Patent No. 2,417,893 and comprises reacting an olefin with ammonia in the presence of reduced cobalt or nickel metal oxide catalysts. The reaction mixture comprising the olefin and ammonia is contac ed with the cobalt or nickel catalyst at a reaction temperature within the range of about 500° to 800° F. and a pressure ranging from about 500 to 5000 pounds per square inch. In addition to the production of the amines, this process also results in the formation of large amounts of by-products including various nitriles and polymeric material. The large percentage of by-products found in the reaction product mixture obtained in the patented process obviously presents serious separation problems requiring elaborate treatments and equipment.

One object of the present invention is to provide an improved process for the preparation of aliphatic amines.

Another object of the present invention is to provide a catalytic process for the preparation of lower alkyl amines from alkenes.

A further object of the present invention is to provide a process wherein ethylene is reacted with ammonia in the presence of a catalyst to produce ethylamine.

These and other objects of the present invention will become readily apparent from the ensuing description and illustrative embodiments.

In accordance with the present invention, it has now been found that aliphatic amines can be effectively prepared by contacting a reaction mixture comprising a lower alkene and ammonia with a Group VIII noble metal-containing catalyst. This vapor phase process is conducted at a temperature within the range of about 90° to 175° C., and preferably within the range of about 100° to 130° C. The use of atmospheric or near atmospheric pressures is preferred, although pressures up to about 2000 p.s.i. and especially up to about 100 p.s.i. may be employed without encountering deleterious results. The ability to carry out this process at temperatures and pressures which are considerably below those prescribed in the prior art processes is an important advantage of the present invention.

The olefinic starting material is a lower alkene having from 2 to 6 carbon atoms per molecule including ethylene, propylene, butene, isobutylene, hexene, and mixtures thereof. The use of either ethylene, propylene, or isobutylene is especially preferred. It will be understood that the source of the starting material is not critical, and that the alkene feed may contain moderate amounts of saturated hydrocarbons. Such materials apparently do not enter into the reaction and constitute merely inert diluents.

The molar ratio of the alkene to ammonia may range from about 1/0.1 to 1/10 in order to achieve maximum utilization of the feed materials and to minimize the amount of unreacted feed which is generally recycled for economic large scale, commercial operations, the molar ratio of the reactants is preferably maintained at about 3/1.

In accordance with another aspect of the present invention, it was found that water may be present in the reaction mixture and, in general, favors increased yields of the aliphatic amines. The molar ratio of alkene to water will range from about 4/1 to 50/1, and preferably from about 6/1 to 10/1. The theoretical reasons for the attainment of increased yields of the aliphatic amines by the use of water is not fully understood at this time. Moreover, it will be understood that the use of water as a component of the reaction feed mixture is not an essential feature of the instant invention, and that the reaction can be effectively carried out even in its absence.

The use of a Group VIII noble metal-containing catalyst is one of the most important features of the present invention. The catalyst can be any member of the platinum group or the palladium group of metals or an oxide or a salt thereof, either organic or inorganic. Preferably the catalyst is a Group VIII noble metal, salt, or oxide, specific examples of which include palladium, platinum, rhodium, ruthenium, osmium, iridium, palladous benzoate, palladous acetate, palladous propionate, ruthenium acetate, platinous benzoate, rhodium acetate, palladous chloride, rhodium trichloride, rhodium oxide, ruthenium chloride, ruthenium oxide, iridium chloride, and the like as well as mixtures thereof. The use of palladium metal is especially preferred.

The catalyst may be unsupported or supported on a suitable inert material such as carbon, silica, alumina, or the like. The use of an alumina support is preferred. It is also possible to increase the activity of the catalyst, if desired, by the addition of from about 1 to 10 equivalents per equivalent of metal catalyst of an alkali or alkaline earth metal salt or a transition metal salt promoter or mixtures of such promoters. Illustrative compounds which may be employed for this purpose include sodium acetate, potassium acetate, lithium hydroxide, calcium oxide, cobalt chloride, ferric chloride, ferric bromide, ferric acetate, cupric chloride, cupric acetate, manganese chloride, chromium chloride, sodium chloride, etc. An alkali metal salt, and especially sodium acetate, is the preferred promoter.

The process of this invention may be carried out in either a continuous or batch manner utilizing conventional vapor phase reaction equipment. The catalyst may either be employed in the form of a fixed or fluidized bed. It is also possible to employ conventional separation procedures for recovering the desired aliphatic amine products from the gaseous reaction product mixture which, in addition to the aliphatic amines, may contain unreacted feed materials and by-products. As previously discussed, commercial operations would generally entail the recovery and recycling of unreacted feed materials. It will be further understood that neither the exact method of carrying out the present process nor the product recovery method are critical features of this invention.

The invention will be more fully understood by reference to the following illustrative embodiments.

EXAMPLE I

A glass reactor was filled with a catalyst bed of 2 percent palladium metal supported on alumina spheres. The reactor was jacketed so that it could be externally heated.

The temperature was raised to 120° C. with a flow of dry nitrogen through the bed. At 120° C. the flow was switched to a mixture of 0.75 liter per hour of ethylene and 0.75 liter per hour of anhydrous ammonia. The effluent gas from the reactor was passed through a trap cooled to about −25° C. containing a known amount of dimethyl formamide as a trapping liquid. After suitable time intervals aliquots of the trap contents were gas chromatographed and shown to contain ethylamine by comparison of elution time with a known sample of ethylamine.

EXAMPLE II

The procedure of Example I was repeated except that the ethylene stream contained about 90 mm. partial pressure of water vapor. The results were similar to Example I.

EXAMPLE III

The procedure of Example I was again repeated except that at 120° C. the flow of dry nitrogen through the bed was switched to a mixture of 0.5 liter per hour of anhydrous ammonia and 1.5 liters per hour of propylene. The effluent gas from the reactor was passed through a trap cooled to about −25° C. containing a known amount of dimethyl formamide as a trapping liquid. Aliquots of the trap contents were gas chromatographed and shown to contain isopropylamine and n-propylamine by comparison of elution time with known samples of these compounds. The eluted peaks from the chromatograph were individually collected and confirmed as isopropylamine and n-propylamine by mass spectroscopy.

The above data show that the process of this invention can be effectively employed for the production of aliphatic primary amines. More particularly, the specific embodiments demonstrate that ethylamine can be formed by reacting ethylene and ammonia in the presence of a Group VIII noble metal-containing catalyst. The process is, moreover, carried out under reaction conditions which are economically advantageous when compared to the reaction conditions prescribed by the prior art processes.

While particular embodiments of this invention are shown above, it will be understood that the invention is obviously subject to variations and modification without departing from its broader aspects. Thus, for example propylene may be employed as the starting material in place of the ethylene to produce n-propylamine and isopropylamine.

What is claimed is:
1. A process for the production of aliphatic amines which comprises contacting in the vapor phase a reaction feed mixture comprising a lower alkene having from 2 to 6 carbon atoms and ammonia with a Group VIII noble metal-containing catalyst at a temperature within the range of about 90° to 175° C. at a pressure of from ambient to about 2000 p.s.i.
2. The process of claim 1 wherein said alkene is selected from the group consisting of ethylene, propylene, isobutylene and mixtures thereof wherein the ratio of alkene to ammonia is from 1:0.1 to 1:10 and the catalyst is a palladium metal-containing catalyst supported on an inert carrier.
3. The process of claim 2 wherein said carrier is alumina.
4. The process of claim 2 for the preparation of ethylamine which comprises contacting in the vapor phase a gaseous feed mixture comprising ethylene and ammonia with a palladium group metal-containing catalyst supported on an inert carrier at an elevated temperature from about 90° C. to about 175° C. at pressures from ambient to about 100 p.s.i.
5. The process of claim 4 wherein said catalyst is palladium metal supported on alumina.
6. The process of claim 4 wherein said gaseous feed mixture contains a minor amount of water vapor and wherein the molar ratio of ethylene to ammonia is about 3:1.
7. The process of claim 2 for the preparation of an admixture of isopropylamine and n-propylamine which comprises contacting in the vapor phase a gaseous feed mixture comprising propylene and ammonia with a palladium metal-containing catalyst on an inert carrier at an elevated temperature of from about 90° C. to about 175° C. at a pressure of from ambient to about 100 p.s.i.
8. The process of claim 7 wherein said gaseous feed mixture contains a minor amount of water vapor.
9. The process of claim 7 wherein said inert carrier is alumina.

References Cited

UNITED STATES PATENTS

| | | | |
|---|---|---|---|
| 2,294,442 | 9/1942 | Bersworth | 260—585 |
| 2,417,893 | 3/1947 | Teter | 260—585 |

CHARLES B. PARKER, *Primary Examiner.*

R. L. RAYMOND, *Assistant Examiner.*